No. 847,512. PATENTED MAR. 19, 1907.
J. M. SAUSSER.
PLOW DEPTH REGULATOR.
APPLICATION FILED JUNE 19, 1906.
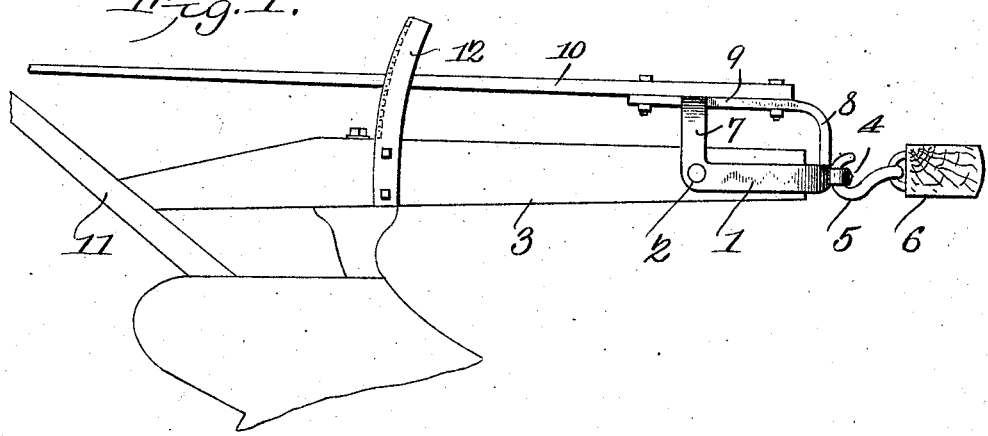
Fig. 1.
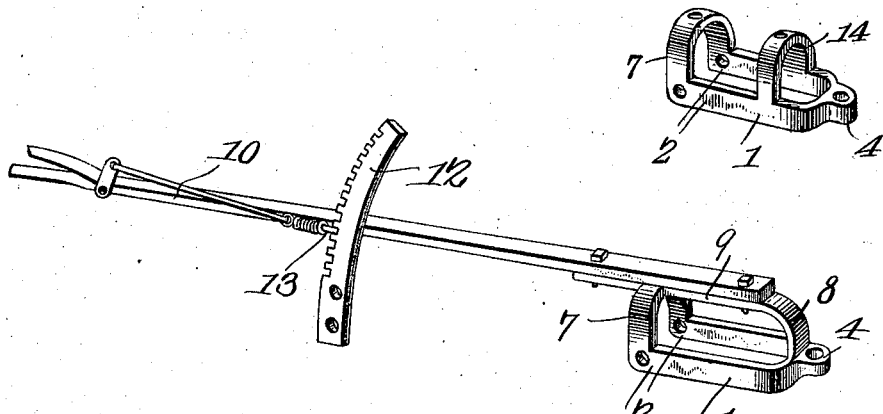
Fig. 3.
Fig. 2.
WITNESSES:
John M. Sausser,
INVENTOR,
By
ATTORNEYS

UNITED STATES PATENT OFFICE.

JOHN MARK SAUSSER, OF OSNABURG, OHIO.

PLOW-DEPTH REGULATOR.

No. 847,512.  Specification of Letters Patent.  Patented March 19, 1907.

Application filed June 19, 1906. Serial No. 322,461.

*To all whom it may concern:*

Be it known that I, JOHN MARK SAUSSER, a citizen of the United States, residing at Osnaburg, in the county of Stark and State of Ohio, have invented a new and useful Plow-Depth Regulator, of which the following is a specification.

This invention has relation to devices adapted to regulate the depth at which a plow will cut the soil; and it consists in the novel construction and arrangement of its parts, as hereinafter shown and described.

The object of the invention is to provide a simple and effective means for regulating the cutting depth of tilling-plows, said device being so constructed as to be easily and readily adjusted and operated.

It consists, primarily, of a clevis pivoted to the plow-beam to which the draft-animals are attached. The clevis is provided with hood-shaped portions which pass over the top of the beam and to which the end of a lever is attached. The rear end of the lever is located within operating distance of the plow-handles. The lever passes by a suitable segmental rack and is provided with the usual spring-actuated pawl for engaging said rack, whereby the said lever is temporarily fixed.

In the accompanying drawings, Figure 1 is a side elevation of a plow equipped with the cutting-depth regulator. Fig. 2 is a perspective view of the cutting-depth regulator detached from the plow. Fig. 3 is a perspective view of a modified form of the cutting-depth regulator.

The regulator consists of the U-shaped clevis which is pivoted at its ends 2 2 to the beam 3 of the plow. Said clevis passes around the front of the beam 3 and is provided at its center with the eye 4, which is adapted to receive the links or hook 5 by means of which the tree 6 is attached to the clevis. The draft-animals (not shown) are suitably attached to the tree 6.

The arch member 7 is attached at its ends to the ends of the clevis 1. Said member 7 passes up over the beam 3. The brace 8 is attached at its forward end to the center of the clevis 1 in the vicinity of the eye 4. Said brace member 8 extends over the beam 3 and is provided with the substantially horizontal section 9, which joins the arch member 7 and extends for some distance to the rear thereof. The lever 10 is bolted to the section 9 of the brace member 8. Said lever extends back to within operating distance of the plow-handles 11. The segmental rack 12 is attached to the plow-beam 3.

The lever 10 is provided with the spring-actuated dog 13 of ordinary construction, which is adapted to engage and disengage the teeth of the segment 12. It will thus be seen that as the operating end of the lever 10 is raised or lowered the opposite end of the said lever will cause the clevis 1 to tilt upon its pivotal points with relation to the plow-beam 3, and thus the angle between the line of draft and the longitudinal axis of the said plow-beam may be varied. This variance in the angle of the line-draft and plow-beam will cause the plow to cut a deep or shallow furrow, according to the direction in which the said clevis 1 is moved. If, for instance, it is desired that the plow cut a deep furrow, the rear end of the lever 10 will be depressed. This will elevate the eye 4 of the clevis 1, and the point of the plow will have a downward inclination, which will increase the depth of the furrow. If, however, it is desired to cut a shallow furrow, the rear end of the lever 10 is elevated, and the eye 4 of the clevis 1 is correspondingly depressed. This gives the point of the plow an upward inclination, and consequently a shallow furrow is the result.

In the form of the invention as shown in Fig. 3 the clevis 1 is provided with the integral arch members 7 and 14, the arch member 7 being located at the rear end of the said clevis and the member 14 being located near the forward end thereof. In this form of the invention the brace member 8 is not used, and the end of the lever 10 is bolted to the upper portions of the arch members 7 and 14.

Having described my invention, what I claim as new, and desire to secure by Letters Patent, is—

1. A device for regulating the depth of furrow cut by a plow consisting of a clevis pivoted at its ends to the plow-beam and extending around the end of the same, said clevis being provided with means to which the draft-animal attachments may be applied, an arch member connecting with the clevis at the pivotal points thereof and extending over the plow-beam, a brace member connecting with said clevis at an intermediate point thereof and extending up over the end of the plow-beam and connecting with said arch member, a lever attached to said arch and brace members and extending back to within operating distance of the plow-handles, and a means located upon the plow-beam and adapted to retain the lever in temporary fixed positions.

2. A device for regulating the depth of furrow cut by a plow consisting of a clevis pivoted at its ends to the plow-beam and passing around the front end thereof and having at its intermediate point means adapted to receive the draft-animal attachments, an arch member fixed to the ends of the clevis and extending over the plow-beam, a brace member fixed at its end to an intermediate point of the clevis and extending over the end of the plow-beam and having a horizontal portion which connects with the arch member and projects in the rear thereof, a lever fixed to said horizontal portion of the brace member and extending back to within operating distance of the plow-handles, a means attached to the plow-beam and adapted to engage the lever to retain the same in temporary fixed positions.

3. A device for regulating the depth of furrow cut by a plow consisting of a clevis pivotally attached to the plow and having means to which the draft-animal attachments may be applied, an arch member attached to the clevis and being vertically disposed over the pivotal points thereof and passing over the plow-beam, a second arch member also attached to the clevis and being located in advance of the first said arch member and being spaced from the same, and a lever attached to said arch members.

In testimony that I claim the foregoing as my own I have hereto affixed my signature in the presence of two witnesses.

JOHN MARK SAUSSER.

Witnesses:
W. O. WENTZ,
DELLA REBILLOT.